US 6,587,601 B1

(12) United States Patent
Hsu et al.

(10) Patent No.: US 6,587,601 B1
(45) Date of Patent: Jul. 1, 2003

(54) METHOD AND APPARATUS FOR PERFORMING GEO-SPATIAL REGISTRATION USING A EUCLIDEAN REPRESENTATION

(75) Inventors: Stephen Charles Hsu, East Windsor, NJ (US); Supun Samarasekera, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1 day.

(21) Appl. No.: 09/605,915

(22) Filed: Jun. 28, 2000

Related U.S. Application Data

(60) Provisional application No. 60/141,460, filed on Jun. 29, 1999.

(51) Int. Cl.[7] .............................. G06K 9/32; G06F 7/00
(52) U.S. Cl. ........................ 382/294; 707/100; 382/154
(58) Field of Search .............................. 382/294, 295, 382/296, 154, 305, 312, 254, 276, 289, 284, 293; 702/5; 707/1, 100; 356/138, 139.09; 345/648, 419, 427, 651; 701/215; 348/135, 144

(56) References Cited

U.S. PATENT DOCUMENTS

| | | | | |
|---|---|---|---|---|
| 4,179,824 A | | 12/1979 | Marsh ........................ 35/10.24 |
| 4,232,313 A | | 11/1980 | Fleishman .................. 343/6 R |
| 5,124,915 A | * | 6/1992 | Krenzel ........................ 702/5 |
| 5,546,529 A | * | 8/1996 | Bowers et al. .............. 345/348 |
| 5,633,946 A | | 5/1997 | Lachinski et al. .......... 382/103 |
| 5,649,032 A | | 7/1997 | Burt et al. ................... 382/284 |
| 5,657,402 A | | 8/1997 | Bender et al. .............. 382/284 |
| 5,724,129 A | * | 3/1998 | Matteucci ............... 356/139.09 |
| 5,764,871 A | * | 6/1998 | Fogel ........................ 345/427 |
| 5,784,431 A | | 7/1998 | Kalend et al. ................ 378/65 |
| 5,878,356 A | * | 3/1999 | Garrot, Jr. et al. ............... 701/1 |
| 5,920,394 A | * | 7/1999 | Gelbart et al. ............... 356/615 |
| 5,963,664 A | | 10/1999 | Kumar et al. ................ 382/154 |
| 5,968,109 A | | 10/1999 | Israni et al. ................. 701/208 |
| 5,995,681 A | * | 11/1999 | Lee et al. .................... 382/293 |
| 6,137,491 A | * | 10/2000 | Szeliski ....................... 345/419 |
| 6,173,067 B1 | * | 1/2001 | Payton et al. ............... 382/106 |
| 6,396,960 B1 | * | 5/2002 | Yoshimura ................... 382/284 |

OTHER PUBLICATIONS

Kumar, et al., "Registration of Video to Geo-referenced imagery", Proc. 14th Int. Conf. Pattern Rec., Brisbane, QLD, Australia, IEEE Compu Soc, 2, 1998, p. 1393–1400.
HongJiang Zhang, Atreyi Kankanhalli, Stephen W. Smoliar, "Automatic Partitioning of Full–Motion Video", Multimedia Systems, pp. 10–28, 1993.
Kumar et al. "Registration of Video to Geo-Referenced Imagery" IEEE, pp. 1393–1400, 1998.
Hsu et al. "Influence of Global Constraints and Lens Distortion of Pose and Appearance Recovery from a Purely Rotating Camera" IEEE, pp. 154–159, 1998.

(List continued on next page.)

Primary Examiner—Bhavesh M. Mehta
Assistant Examiner—Kanji Patel
(74) Attorney, Agent, or Firm—William J. Burke (57) ABSTRACT

A system and method for accurately mapping between camera coordinates and geo-coordinates, called geo-spatial registration, using a Euclidean model. The system utilizes the imagery and terrain information contained in the geo-spatial database to precisely align geographically calibrated reference imagery with an input image, e.g., dynamically generated video images, and thus achieve a high accuracy identification of locations within the scene. When a sensor, such as a video camera, images a scene contained in the geo-spatial database, the system recalls a reference image pertaining to the imaged scene. This reference image is aligned very accurately with the sensor's images using a parametric transformation produced by a Euclidean model. Thereafter, other information that is associated with the reference image can easily be overlaid upon or otherwise associated with the sensor imagery.

30 Claims, 4 Drawing Sheets

OTHER PUBLICATIONS

Behringer, Reinhold "Registration for Outdoor Augmented Reality Applications Using Computer Vision Techniques and Hybrid Sensors", IEEE, pp. 244–251, 1999.

Tarel et al. "A Coarse to Fine 3D Registration Method Based on Robust Fuzzy Clustering" Computer Vision and Image Understanding, vol. 73, No. 1, pp. 14–28, Jan. 1999.

* cited by examiner

METHOD AND APPARATUS FOR PERFORMING GEO-SPATIAL REGISTRATION USING A EUCLIDEAN REPRESENTATION

This non-provisional application claims the benefit of U.S. provisional application Ser. No. 60/141,460 filed Jun. 29,1999, which is hereby incorporated herein by reference.

This application contains subject matter related to U.S. patent application Ser. No. 09/075,462, filed May 8, 1998 and incorporated herein by reference.

The invention is generally related to image processing systems and, more specifically, to a method and apparatus for performing geo-spatial registration using a Euclidean representation within an image processing system.

GOVERNMENT SUPPORT

This invention was made with Government support under Subcontract No. K57S00006 to Sarnoff Corporation under Prime Contract No. -4206 awarded by the U.S. Department of the Air Force and Contract No. NMA202-97-D-1033 awarded by the National Imagery and Mapping Agency. The Government has certain rights in this invention.

BACKGROUND OF THE INVENTION

The ability to locate scenes and/or objects visible in a video/image frame with respect to their corresponding locations and coordinates in a reference coordinate system is important in visually-guided navigation, surveillance and monitoring systems. Aerial video is rapidly emerging as a low cost, widely used source of imagery for mapping, surveillance and monitoring applications. The individual images from an aerial video can be aligned with one another and merged to form an image mosaic that can form a video map or provide the basis for estimating motion of objects within a scene. One technique for forming a mosaic from a plurality of images is disclosed in U.S. Pat. No. 5,649,032, issued Jul. 15, 1997, which is hereby incorporated herein by reference.

To form a "video map", a mosaic (or mosaics) of images may be used as a database of reference imagery and associated "geo-coordinates" (e.g., latitude/longitude within a reference coordinate system) are assigned to positions within the imagery. The geo-coordinates (or other image or scene attributes) can be used to recall a mosaic or portion of a mosaic from the database and display the recalled imagery to a user. Such a searchable image database, e.g., a video map, is disclosed in U.S. patent application Ser. No. 08/970, 889, filed Nov. 14, 1997, and hereby incorporated herein by reference.

A system that images a scene that has been previously stored in the reference database and recalls the reference information in response to the current images to provide a user with information concerning the scene would have applicability in many applications. For example, a camera on a moving platform imaging a previously imaged scene contained in a database may access the database using the coordinates of the platform. The system provides scene information to a user. However, a key technical problem of locating objects and scenes in a reference mosaic with respect to their geo-coordinates needs to be solved in order to ascertain the geo-location of objects seen from the camera platform's current location. In current systems for geo-location, the mapping of camera coordinates to the geo-coordinates, use position and attitude information for a moving camera platform within some fixed world coordinates to locate the video frames in the reference mosaic database. However, the accuracy achieved is only on the order of tens to hundreds of pixels. This inaccuracy is not acceptable for high resolution mapping.

Therefore, there is a need in the art for a method and apparatus that identifies a location within an imaged scene with a sub-pixel accuracy directly from the imagery within the scene itself.

SUMMARY OF THE INVENTION

The disadvantages of the prior art are overcome by the present invention of a system and method for accurately mapping between camera coordinates and geo-coordinates, called geo-spatial registration, using a Euclidean model to align and combine images. The present invention utilizes the imagery and terrain information contained in the geo-spatial database to precisely align the reference imagery with input imagery, such as dynamically generated video images or video mosaics, and thus achieve a high accuracy identification of locations within the scene. The geo-spatial reference database generally contains a substantial amount of reference imagery as well as scene annotation information, digital elevation maps (DEM, and object identification information. When a sensor, such as a video camera, images a scene contained in the geo-spatial database, the system recalls a reference image and DEM pertaining to the imaged scene. This reference image is aligned very accurately with the sensor's images using a parametric transformation derived from a Euclidean model. Thereafter, other information (annotation, sound, and the like) that is associated with the reference image can easily be overlaid upon or otherwise associated with the sensor imagery. Applications of geo-spatial registration include text/graphical/audio annotations of objects of interest in the current video using the stored annotations in the reference database to augment and add meaning to the current video. These applications extend beyond the use of aerial videos into the challenging domain of video/image-based map and database indexing of arbitrary locales, like cities and urban areas.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
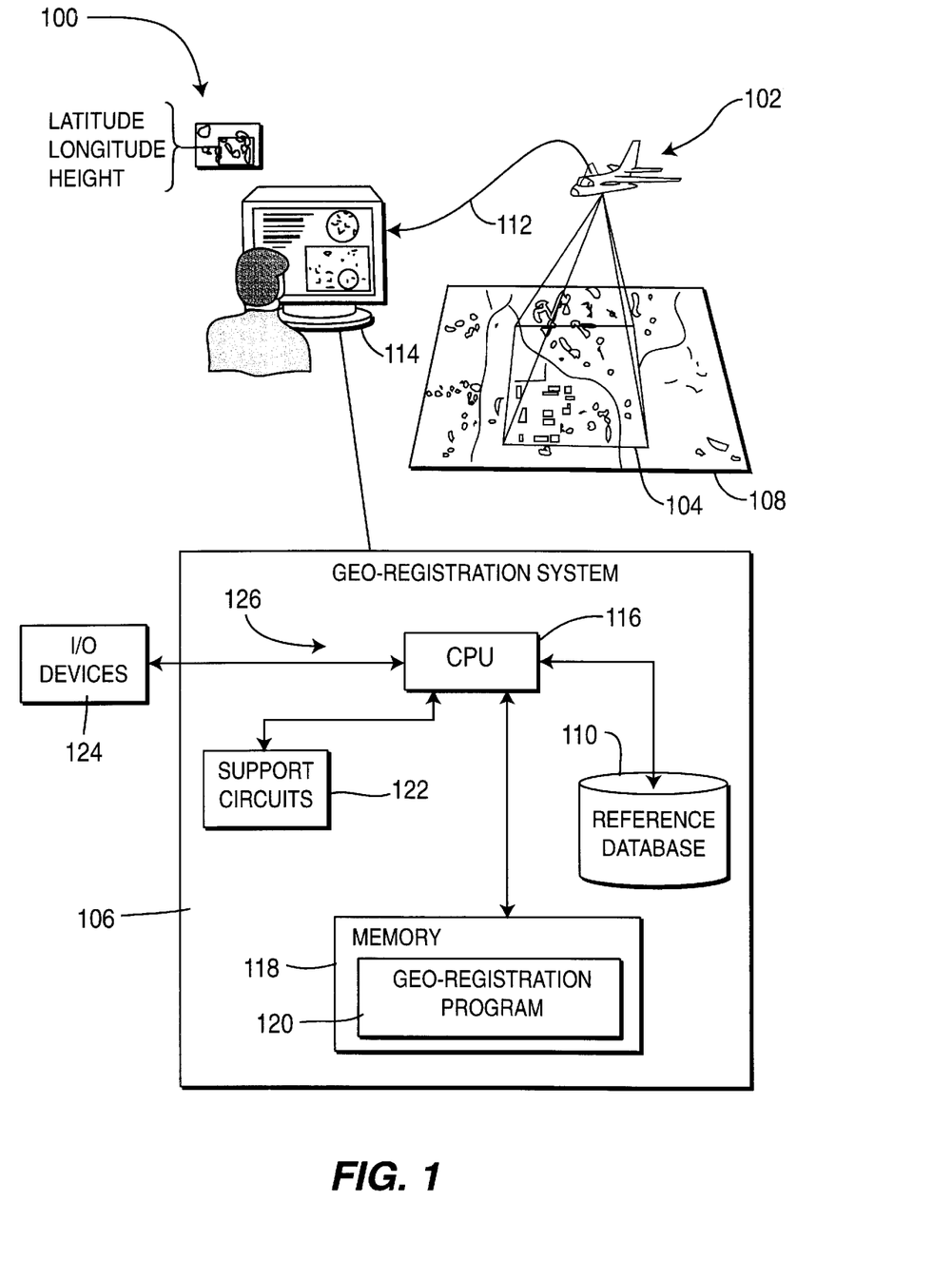
FIG. 1 depicts a conceptual view of a system incorporating the present invention.

FIG. 1 depicts a conceptual view of a comprehensive system 100 containing a geo-registration system 106 of the present invention. The figure shows a mobile platform 102 dynamically capturing "current" video images of a scene at a specific locale 104 within a large area 108. The system 106 identifies information in a reference database 110 that pertains to the current video images being transmitted along path 112 to the system 106. The system 106 "geo-registers" the current video images to the reference information or imagery stored within the reference database 110, i.e., the current video is aligned with geographically calibrated reference imagery and information using a Euclidean model. To facilitate the alignment process, the reference information generally contains a digital elevation map (DEM) that may have a value of zero, a constant, a complex polynomial, and so on. The more complex the DEM the more accurate the alignment results of the geo-registration process. After "geo-registration", the footprints of the current video are shown on a display 114 to a user overlaid upon the reference imagery or other reference annotations. As such, reference information such as latitude/longitude/height of points of interest are retrieved from the database and are overlaid on the relevant points on the current video. Consequently, the user is provided with a comprehensive understanding of the scene that is being imaged.

The system 106 is generally implemented by executing one or more programs on a general purpose computer 126. The computer 126 contains a central processing unit (CPU) 116, a memory device 118, a variety of support circuits 122 and input/output devices 124. The CPU 116 can be any type of high speed processor such as a PENTIUM II manufactured by Intel Corporation or a POWER PC manufactured by Motorola Inc. The support circuits 122 for the CPU 116 include conventional cache, power supplies, clock circuits, data registers, I/O interfaces and the like. The I/O devices 124 generally include a conventional keyboard, mouse, and printer. The memory device 118 can be random access memory (RAM), read-only memory (ROM), hard disk storage, floppy disk storage, compact disk storage, or any combination of these devices. The memory device 118 stores the program or programs (e.g., geo-registration program 120) that are executed to implement the geo-registration technique of the present invention. When the general purpose computer executes such a program, it becomes a special purpose computer, i.e., the computer becomes an integral portion of the geo-registration system 106. Although the invention has been disclosed as being implemented as an executable software program, those skilled in the art will understand that the invention may be implemented in hardware, software or a combination of both. Such implementations may include a number of processors independently executing various programs and dedicated hardware such as application specific integrated circuits (ASICs).

Figure 2:
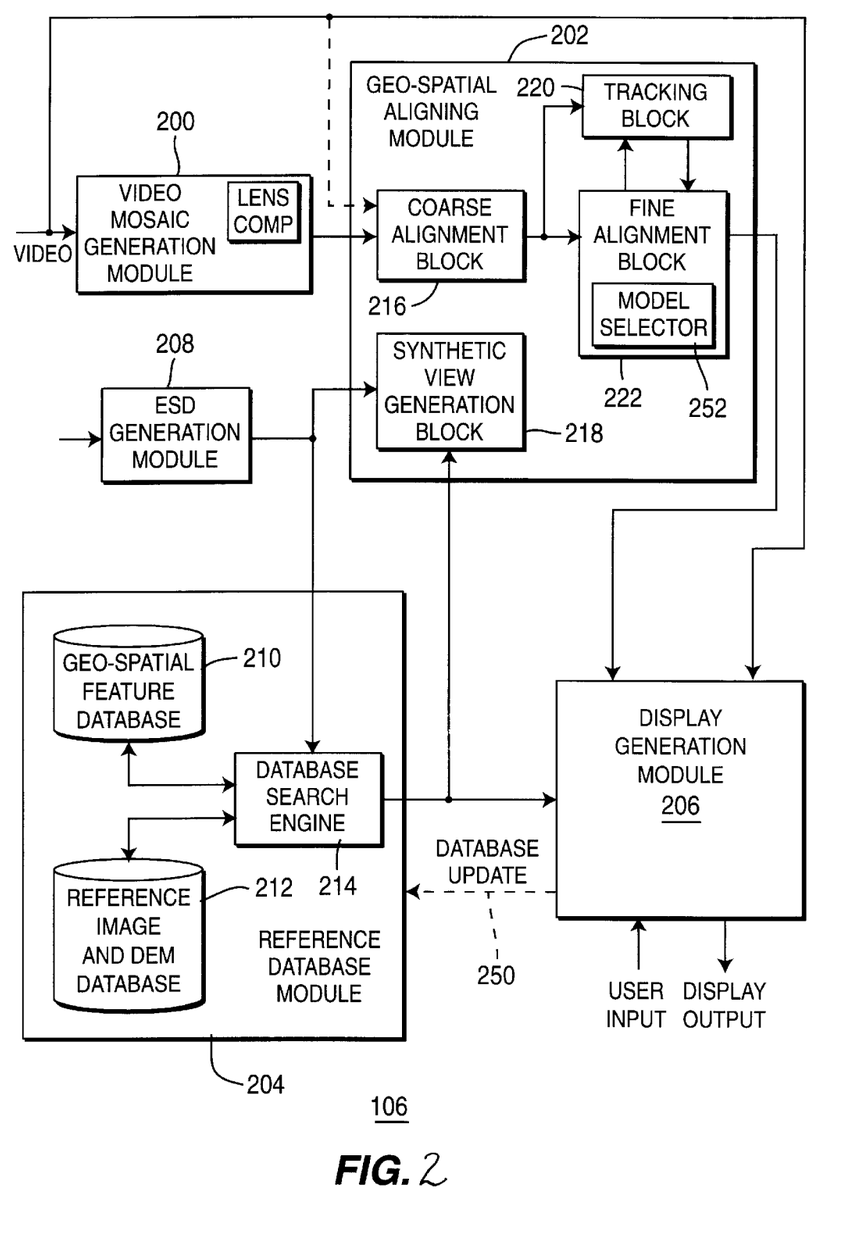
FIG. 2 depicts a functional block diagram of the geo-registration system of the present invention.

FIG. 2 depicts a functional block diagram of the geo-registration system 106 of the present invention. Illustratively, the system 106 is depicted as processing a video signal as an input image; however, from the following description those skilled in the art will realize that the input image (referred to herein as input imagery) can be any form or image including a sequence of video frames, a sequence of still images, a still image, a mosaic of images, a portion of an image mosaic, and the like. In short, any form of imagery can be used as an input signal to the system of the present invention.

The system 106 comprises a video mosaic generation module 200 (optional), a geo-spatial aligning module 202, a reference database module 204, and a display generation module 206. Although the video mosaic generation module 200 provides certain processing benefits that shall be described below, it is an optional module such that the input imagery may be applied directly to the geo-spatial aligning module 202. When used, the video mosaic generation module 200 processes the input imagery by aligning the respective images of the video sequence with one another to form a video mosaic. The aligned images are merged into a mosaic. A system for automatically producing a mosaic from a video sequence is disclosed in U.S. Pat. No. 5,649,032, issued Jul. 15, 1997, and incorporated herein by reference.

The reference database module 204 provides geographically calibrated reference imagery and information (including DEM) that is relevant to the input imagery. The camera platform (102 in FIG. 1) provides certain attitude information that is processed by the engineering support data (ESD) module 208 to provide indexing information that is used to recall reference images (or portions of reference images) from the reference database module 204. A portion of the reference image that is nearest the video view (i.e., has a similar point-of-view of a scene) is recalled from the database and is coupled to the geo-spatial aligning module 202. The module 202 first warps the reference image to form a synthetic image having a point-of-view that is similar to the current video view, then the module 202 accurately aligns the reference information with the video mosaic. The alignment process is accomplished in a coarse-to-fine manner as described in detail below. The transformation parameters that align the video and reference images are provided to the display module 206. Using these transformation parameters, the original video can be accurately overlaid on the reference information, or vice versa, to produce a comprehensive view of the scene.

To obtain input imagery that can be indexed and aligned with respect to geographically calibrated reference imagery and information, as mentioned above, a "video mosaic" representing an imaged scene is produced to remove redundant information in the video image sequence. Video frames are typically acquired at 30 frames per second and contain a substantial amount of frame-to-frame overlap. For typical altitudes and speeds of airborne platforms, the overlap between adjacent frames may range from 4/5 to 49/50th of a single frame. Therefore, conversion of video frames into video mosaics is an efficient way to handle the amount of information contained in the incoming video stream. The invention exploits the redundancy in video frames by aligning successive video frames using low order parametric transformations such as translation, affine and projective transformations. The frame-to-frame alignment parameters enable the creation of a single extended view mosaic image that authentically represents all the information contained in the aligned input frames. For instance, typically 30 frames of standard NTSC resolution (720×480) containing about ten million pixels may be reduced to a single mosaic image containing only about two-hundred thousand to two million pixels depending on the overlap between successive frames. The video mosaic is subsequently used for geo-referencing and location.

Although many alignment algorithms are available that achieve image alignment of video imagery, the present invention uses a projective transformation to align the images. Additionally, the mosaicing process is extended to handle unknown lens distortion present in the imagery. Exemplary alignment processing for images (video images, in particular) is disclosed in U.S. Pat. No. 5,649,032. The result is a video mosaic representing the information contained in the sequence of video frames with any redundant information removed from the mosaic.

Often in aerial video streams, the lens distortion parameters must be explicitly modeled in the estimation process. A fundamental assumption made in the earlier work on mosaicing was that one image could be chosen as the reference image and the mosaic would be constructed by merging all other images to this reference image. The video mosaic generation module 200 extends the direct estimation algorithms of the prior art to use a reference coordinate system but not a reference image. The module 200 computes the motion parameters that warp all images to a virtual image mosaic in this reference coordinate system. Each pixel in this virtual image mosaic is predicted by intensities from more than one image. An error measure is minimized over the virtual image to compensate for lens distortion. The error measure may be the sum of the variances or the sum of the predicted pixel intensities at each pixel location. U.S. patent application Ser. No. 08/966,776, filed Nov. 10, 1997 and incorporated herein by reference, discloses the details of a lens distortion compensation procedure. Although the lens distortion compensation procedure does not require a reference image, the present invention uses a reference image in the alignment process and this reference imagery can also be used to facilitate lens distortion compensation.

In order to compute the correspondences of the video frames and the unknown parameters simultaneously, the invention uses an error function that minimizes the variance in intensities of a set of corresponding points in the images, that map to the same ideal reference coordinate. Formally, the unknown projective transformation parameters for each frame, $A^1 \ldots A^N$, and the lens distortion parameter, $\gamma_1$ are solved using Equation 1.

$$\min_{A^1 \ldots A^N, \gamma_1} \sum_p \frac{1}{M(p)} \sum_i (I_i(p^i) - \bar{I}(p))^2 \quad (1)$$

where point $p^i$ in frame i is a transformation of a point p in the reference coordinate system, $\bar{I}(p)$ is the mean intensity value of all the $p^i$'s that map to p, and M(p) is a count of all such $p^i$'s. Therefore, given a point p in the reference coordinates, each term in the summation over i in Equation 1 is the variance of all the intensity values at points $p^i$ that map to point p.

In geo-spatial registration scenarios, the look angles of the imaging platform with respect to the Earth may be known with varying degrees of precision. The knowledge of these angles and other engineering support data (ESD) can be used to correct for oblique look angles in order to generate a nadir view, i.e., use a process for ortho-correction. After performing ortho-correction, video mosaics may be created as described above. Ortho-corrected mosaics have the advantage that the view in an orthographic coordinate system is similar to that available in orthographic photographs.

Depending on the imaging scenario, ortho-corrected video mosaicing may have to account for the effects of parallax. The processing involved has to use the three-dimensional parallax present in the scene along with the warping transformation that accounts for the oblique angles of the camera platform. To account for parallax, the invention can use one of two approaches: (1) warp the imagery using any pre-existing Digital Elevation Map (DEM) information contained in the database or (2) account for parallax by computing the parallax using multiple images of the scene. Parallax computation from multiple video images and its use in the creation of parallax-corrected mosaics is disclosed in commonly assigned U.S. patent application Ser. No. 08/493,632, filed Jun. 22, 1995 and incorporated herein by reference.

In addition to image information, the sensor platform (102 in FIG. 1) also provides engineering support data (ESD), e.g., global positioning system (GPS) information, Inertial Navigation System (INS) information, image scale, attitude, rotation, and the like, that is extracted from the signal received from the platform and provided to the geo-spatial aligning module 202 as well as the database module 204. Specifically, the ESD information is generated by the ESD generation module 208. The ESD is used as an initial scene identifier and sensor point-of-view indicator. As such, the ESD is coupled to the reference database module 204 and used to recall database information that is relevant to the current sensor video imagery. Moreover, the ESD can be used to maintain coarse alignment between subsequent video frames over regions of the scene where there is little or no image texture that can be used to accurately align the mosaic with the reference image.

More specifically, the ESD that is supplied from the sensor platform along with the video is generally encoded and requires decoding to produce useful information for the geo-spatial aligning module 202 and the reference database module 204. Using the ESD generation module 208, the ESD is extracted or otherwise decoded from the signal produced by the camera platform to define a camera model (position and attitude) with respect to the reference database. Of course, this does not mean that the camera platform and system can not be collocated, i.e., as in a hand held system with a built in sensor, but means merely that the position and attitude information of the current view of the camera is necessary.

Given that ESD, on its own, can not be reliably utilized to associate objects seen in videos (i.e., sensor imagery) to their corresponding geo-locations, the present invention utilizes the precision in localization afforded by the alignment of the rich visual attributes typically available in video imagery to achieve exceptional alignment rather than use ESD alone. For aerial surveillance scenarios, often a reference image database in geo-coordinates along with the associated DEM maps and annotations is readily available. Using the camera model, reference imagery is recalled from the reference image database. Specifically, given the camera's general position and attitude, the database interface recalls imagery (one or more reference images or portions of reference images) from the reference database that pertains to that particular view of the scene. Since the reference images generally are not taken from the exact same perspective as the current camera perspective, the camera model is used to apply a perspective transformation (i.e., the reference images are warped) to create a set of synthetic reference images from the perspective of the camera.

The reference database module 204 contains a geo-spatial feature database 210, a reference image and digital evaluation map (DEM) database 212, and a database search engine 214. The geo-spatial feature database 210 generally contains feature and annotation information regarding various features of the images within the image database 212. The reference database 212 contains images (which may include mosaics) and DEMs of a scene. The two databases are coupled to one another through the database search engine 214 such that features contained in the images of the reference database 212 have corresponding annotations in the feature database 210. Since the relationship between the annotation/feature information and the reference information is known, the annotation/feature information can be aligned with the video images using the same parametric transformation that is derived to align the reference images to the video mosaic.

The database search engine 214 uses the ESD to select a reference image and DEM or a portion of a reference image and DEM in the reference image and DEM database 204 that most closely approximates the scene contained in the video. If multiple reference images and DEMs of that scene are contained in the reference image and DEM database 212, the engine 214 will select the reference image and DEM having a viewpoint that most closely approximates the viewpoint of the camera producing the current video. The selected reference image and DEM is coupled to the geo-spatial aligning module 202.

The geo-spatial aligning module 202 contains a coarse alignment block 216, a synthetic view generation block 218, a tracking block 220 and a fine alignment block 222. The synthetic view generation block 218 uses the ESD and reference DEM to warp a reference image to approximate the viewpoint of the camera generating the current video that forms the video mosaic. These synthetic images form an initial hypothesis for the geo-location of interest that is depicted in the current video data. The initial hypothesis is typically a section of the reference imagery warped and transformed so that it approximates the visual appearance of the relevant locale from the viewpoint specified by the ESD.

The alignment process for aligning the synthetic view of the reference image with the input imagery (e.g., the video mosaic produced by the video mosaic generation module 200, the video frames themselves that are alternatively coupled from the input to the geo-spatial aligning module 202 or some other source of input imagery) is accomplished using two steps. A first step, performed in the coarse alignment block 216, coarsely indexes the video mosaic and the synthetic reference image to an accuracy of a few pixels. In some instances, the first step of coarse alignment is not used and the invention only performs fine alignment. As such, the video mosaic generation module 200 is coupled directly to the fine alignment block 222.

A second step, performed by the fine alignment block 222, accomplishes fine alignment to accurately register the synthetic reference image and video mosaic with a sub-pixel alignment accuracy without performing any camera calibration. The fine alignment block 222 achieves a sub-pixel alignment between the images using a Euclidean model. The Euclidean model is one of a number of models that is selected by a model selector 252. The model selection process is described with respect to FIG. 4 below. The output of the geo-spatial alignment module 202 is a parametric transformation that defines the relative positions of the reference information and the video mosaic. This parametric transformation is then used to align the reference information with the video such that the annotation/features information from the feature database 210 are overlaid upon the video or the video can be overlaid upon the reference images or both. In essence, accurate localization of the camera position with respect to the geo-spatial coordinate system is accomplished using the video content.

Finally, the tracking block 220 updates the current estimate of sensor attitude and position based upon results of matching the sensor image to the reference information. As such, the sensor model is updated to accurately position the sensor in the coordinate system of the reference information. This updated information is used to generate new reference images to support matching based upon new estimates of sensor position and attitude and the whole process is iterated to achieve exceptional alignment accuracy. Consequently, once initial alignment is achieved and tracking commenced, the geo-spatial alignment module may not be used to compute the parametric transform for every new frame of video information. For example, fully computing the parametric transform may only be required every thirty frames (i.e., once per second). Once tracking is achieved, the indexing block 216 and/or the fine alignment block 222 could be bypassed for a number of video frames. The alignment parameters can generally be estimated using frame-to-frame motion such that the alignment parameters need only be computed infrequently.

Figure 3:
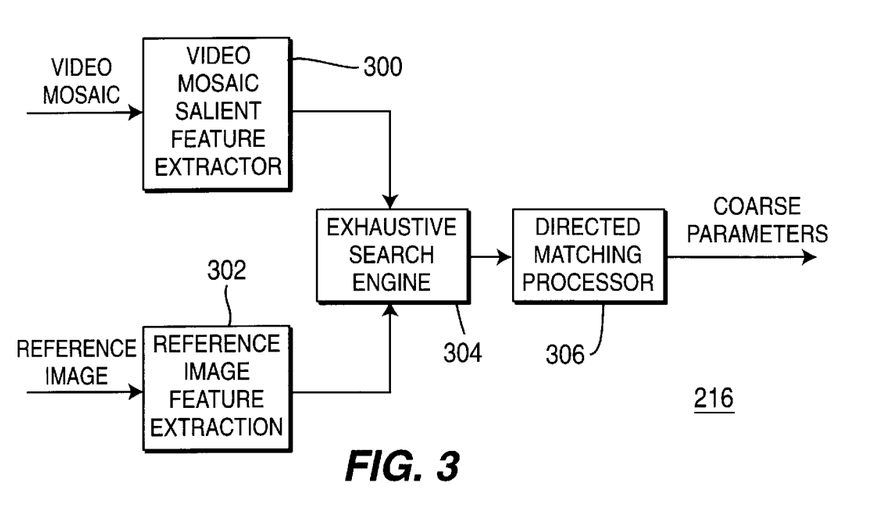
FIG. 3 depicts a functional block diagram of the coarse alignment block of the system in FIG. 2.

FIG. 3 depicts a functional block diagram of the coarse alignment block 216 which contains a video mosaic salient feature extractor 300, a reference image salient feature extractor 302, an exhaustive search engine 304, and a directed matching processor 306. The coarse indexing process locates a video mosaic within a reference image using visual appearance features. In principle, one could exhaustively correlate the intensities in the video mosaic and the reference image at each pixel and find the best match. However, due to the uncertainties in viewpoint defined by ESD and due to real changes in appearance between the reference imagery and the current video, it may not be possible to directly correlate intensities in the two images. The real changes in appearance may be due to change of reflectance of objects and surfaces in the scene (e.g., summer to fall, shadows and the like) and due to difference in illumination between the reference and the video imagery. Changes in appearance due to viewpoint are accounted for to a large extent by the process of warping the reference image to the ESD defined viewpoint. However, for robust matching and localization, indexing and matching must be resilient to uncertainties in ESD and to real changes in the imagery.

The coarse alignment block 216 computes features at multiple scales and multiple orientations that are invariant or quasi-invariant to changes in viewpoint. To facilitate such multiple scale computation, the reference images may be stored as image pyramids or image pyramids may be computed when the reference image is recalled from the database. In any event, the reference image scale and resolution should be comparable to that of the video mosaic. To achieve flexibility, the salient feature extractors 300 and 302 may both contains image pyramid generators such that both the video mosaic and the reference image are decomposed into image pyramids to facilitate rapid and accurate salient feature extraction.

Whether operating upon a full video mosaic and reference image or a level of a pyramid from the two images, the salient feature extractors 300 and 302 compute many salient locations both in the reference and video imagery. Such salient feature detection and processing is disclosed in T. Lindeberg, "Detecting Salient Blob-like Image Structures and Their Scales with a Scale-space Primal Sketch: A Method for Focus-of-attention," International Journal of Computer Vision, 1994. The salient feature locations are determined automatically based on distinctiveness of local image structure, i.e., the salient features may be low frequency blobs, high frequency corners or edges, or some combination of these features. The features that are considered salient depend on the scale and resolution of the imagery being processed. Even with the feature representations at salient locations only, there may be too much data for exhaustive matching of the salient features. Therefore, in the exhaustive search engine 304, fast indexing of the multi-dimensional visual features is used to eliminate most of the false matches, i.e., the salient features are pruned. Subsequently, the directed matching processor 306 performs directed matching of the small set of remaining candidate matches which leads to the correct coarse location of the video imagery in the reference coordinate system. The directed matching is performed using a "data tree" process that is disclosed in U.S. Pat. No. 5,159,647, issued Oct. 27, 1992, and incorporated herein by reference. The output of the coarse alignment block 216 is a set of coarse parameters for a parametric transform that aligns the reference image to the video mosaic.

Returning to FIG. 2, the coarse localization process of block 216 is used to initialize the process of fine alignment while accounting for the geometric and photometric transformations between the video and reference imagery. In general, the transformation between two views of a scene can be modeled by (i) an external coordinate transformation that specifies the 3D alignment parameters between the reference and the camera coordinate systems, and (ii) an internal camera coordinate system to image transformation that typically involves a linear (affine) transformation and non-linear lens distortion parameters. The fine alignment block 222 jointly computes the external coordinate transformation and the linear internal transformation. This, along with the depth image and the non-linear distortion parameters, completely specifies the alignment transformation between the video pixels and those in the reference imagery. The modeled video-to-reference transformation is applied to the solution of the precise alignment problem. The process involves simultaneous estimation of the unknown transformation parameters as well as the warped reference imagery that precisely aligns with the video imagery. Multi-resolution coarse-to-fine estimation and warping with Gaussian/Laplacian pyramids is employed.

Figure 4:
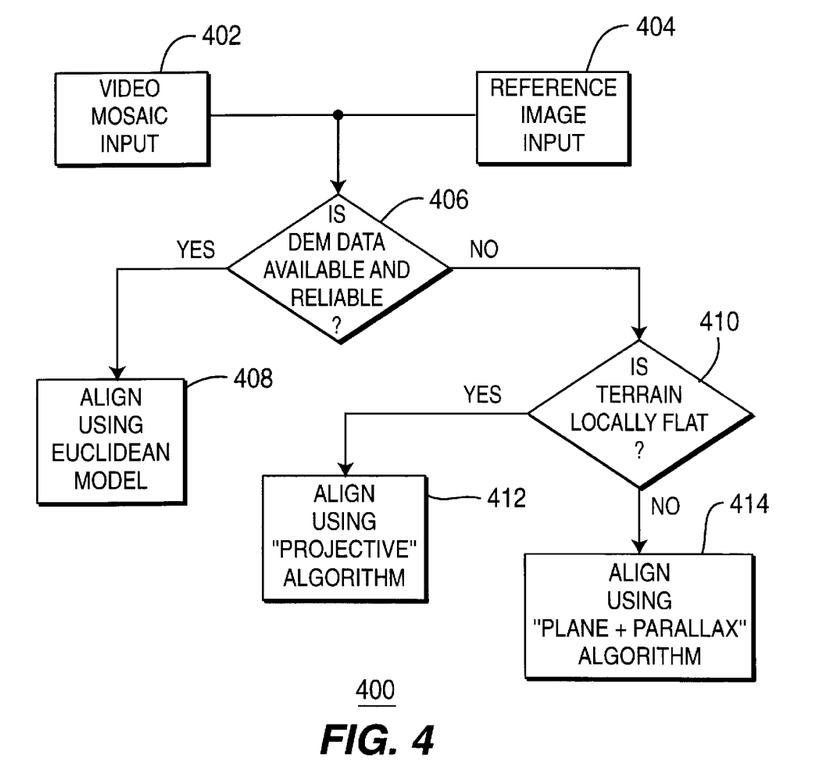
FIG. 4 depicts a flow diagram of the fine alignment block of FIG. 2.

FIG. 4 depicts a process 400 by which the geo-registration program can select the alignment technique that best suits the image content. This process is implemented as a model selector 252 of FIG. 2. The video mosaic is input at step 402 and the reference image is input at step 404. The process queries, at step 406, whether the DEM data is available and reliable. If the query is affirmatively answered, the process proceeds to step 408 where the Euclidean model (described below) is used to accurately align the video mosaic and the reference image. On the other hand, if the query at step 406 is negatively answered, the process proceeds to step 410. At step 410, the process queries whether the terrain is locally flat. If the query is affirmatively answered, the process proceeds to step 412 where the video mosaic is aligned with the reference image using the "projective" algorithm. If the terrain is not locally flat, the process proceeds to step 414 where the "plane+parallax" algorithm is used to align the video mosaic and the reference image. The "projective" and "plane+parallax" algorithms are described in detail in U.S. patent application Ser. No. 08/493,632, filed Jun. 22, 1995, and incorporated herein by reference.

Figure 5:
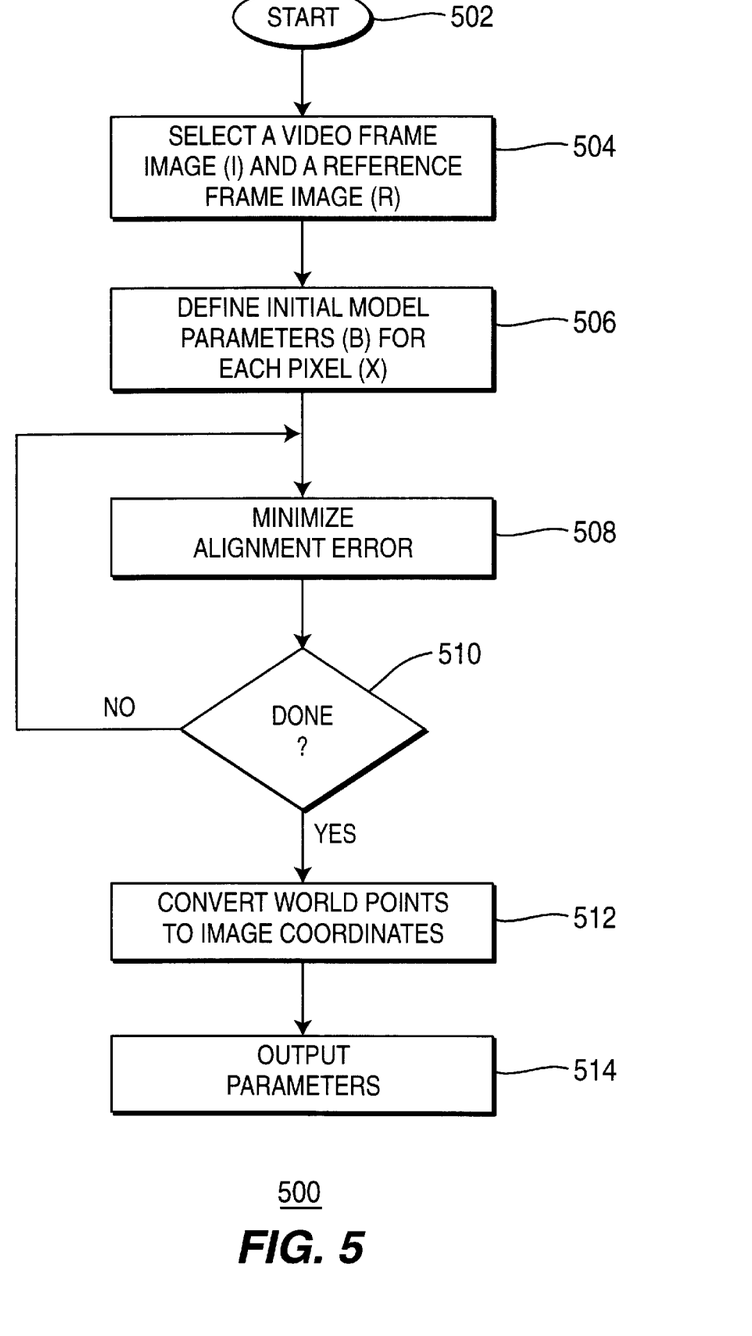
FIG. 5 depicts a flow diagram of a method for aligning images using a Euclidean model.

FIG. 5 depicts a method 500 for determining alignment parameters using a Euclidean model. The Euclidean model of step 408 is defined according to the equation $$u = \pi(K^*(t + \text{diag}(1,1,\beta)^* R^* x_w)) \tag{2}$$

Here, K is the matrix modeling the internal parameters of the camera and any 2D projective image warps applied to the original video frame during pre-processing, except focal length is factored out to be estimated separately. u is the 2D coordinate of a pixel in the preprocessed video frame. $\pi$ is the perspective projection operation which takes a 3-vector U to the 2-vector $(U_x/U_z, U_y/U_z)$. The model uses $\beta=1/f$ (the inverse of the focal length) to avoid computation difficulties when $f \to \infty$ in orthographic viewing. R is the rotation matrix, and $x_w$ is the 3D coordinates of a point in the world seen in the reference image. The model uses a translation vector $t=(t_x,t_y,t_z/f)^T$ where $t_x, t_y$ and $t_z$ are the translations in the camera coordinate system, since the image scale factor $t_z/f$ remains finite even as $t_z, f \to \infty$.

Informally, the transformation from the reference coordinates to the image coordinates can be understood as follows. A pixel $x_w$, the world coordinate system having known height information is rotated by R about the center of the world coordinate system and then translated by $(t_x, t_y, t_z)^T$. Finally, this world point is converted to image coordinates using $\beta$ and K.

The seven parameters that are estimated by the algorithm are the parameters in t, three degrees of freedom in R, and $\beta$. These model parameters are referred to as the B vector. The K matrix is assumed to be accurately known.

More specifically, the method 500 begins at step 502 and proceeds to step 504 where a video frame image (I) and a reference frame image (R) are selected for alignment. At step 506, the method 500 defines initial model parameters (B) for each pixel (x). At step 508, the method minimizes an alignment error as described more fully below. At step 510, the method 500 queries whether the error minimization is complete. If the query is negatively answered, the method recomputes the error. The operation of steps 508 and 510 forms an iterative process that achieves image alignment. Once aligned, the world points used in the computation are converted to image coordinates at step 512. Lastly, the alignment parameters are produced at step 514.

Direct methods for parametric motion estimation minimize an image error measure over the video frame by iteratively updating the model parameters. The direct method defines the error E at a particular pixel x on the reference and for particular model parameters B as $$E(B,x) = I(g(B,x)) - R(x) \tag{3}$$

where I is the video frame, R is the reference, and g is the Euclidean model. The error that is minimized is the sum of squared differences (SSD). Thus, the error for the particular model parameters B is $$E(B) = \Sigma_x (E(B,x))^2 \tag{4}$$

The Gauss-Newton method minimizes this non-linear error function by repeating the following least squares problem. From some current solution $B=(t,R,\beta)$ the algorithm moves to $B_{new}=(t+\Delta t, R(\Delta r)R, \beta+\Delta\beta)$, where $R(\phi)$ denotes rotation of $|\phi|$ radians around the $\phi$ axis. $E(B_{new})$ is approximated by linearizing $E(B_{new},x)$ with respect to the increment $p=(\Delta t, \Delta r, \Delta\beta)$ as $$E(B_{new},x) = E(B,x) + dI/dp^* p.$$

p is chosen to minimize $E(B_{new})$ by solving the linear least squares problem $$\begin{pmatrix} dI_1/dp \\ \ldots \\ dI_m/dp \end{pmatrix} * p = - \begin{pmatrix} E(B, x_1) \\ \ldots \\ E(B, x_m) \end{pmatrix}, \tag{5}$$

where $I_i$ means $I(g(B,x_i))$ for the ith of m pixels in the region of interest.

In practice, the Levenberg-Marquardt modification to Gauss-Newton is used for improved reliability. Furthermore, the direct method is applied on a Laplacian Pyramid of the image and the reference going from coarser to finer levels, while performing Levenberg-Marquardt iterations at each level of the pyramid. Methods for converting the parameters from one level to the next lower level are employed to generate initial estimates of the parameters for the next lower level.

Although the Euclidean model algorithm functions using the previous set of equations and finds the derivatives of u from the transformation equation for each of the parameters to be estimated, the algorithm is improved by normalizing the transformation equation to improve the numerical conditioning of the least squares problem and get greater accuracy in the numerical solution of the parameters. Therefore, the equations are described below for the normalized parameters rather than for the original equations since these are the ones which are actually used.

The algorithm uses normalized u and x such that $u_{norm}$ and $x_{norm}$ have zero mean and unit standard deviation. This will ensure that the parameters to be estimated are properly scaled for better numerical stability of the solution.

The normalized transformation equation is as follows:

$$u_{norm} = \pi\{t_{norm} + \text{diag}(1,1,\beta_{norm}) * R * x_{norm}\} \quad (6)$$

where $$u_{norm} = \pi(K^{-1} * U)/\sigma_{K^{-1}u} \quad (7)$$

$$x_{norm} = (x_w - x_{mean})/\sigma_x. \quad (8)$$

$\sigma_{K^{-1}U}$ the standard deviation of $\pi(K^{-1}U)$ calculated over the video frame coordinates. To define the standard deviation of a vector u, the model uses $$\sigma_u^2 = \sigma_{u_x} + \sigma_{u_y}^2 \quad (9)$$

which is the natural definition of standard deviation using the Euclidean distance to measure distance between two vectors.

$x_w$ is the point location in the world coordinate system and $x_{mean}$ is the mean value of the $x_w$ and is calculated for each frame over the region of interest in the reference. $\sigma_x$ is the standard deviation of $x_w$ over the same region. $\sigma_x$ is defined in the same way as before (i.e., square root of the sum of the squares of the three components).

By equating (2) and (6), parameters can be found as $$\beta_{norm} = \beta * \sigma_{K_{-1}U} \quad (10)$$

and $$t_{norm} = \frac{1}{\sigma_x}(\text{diag}(1, 1, \sigma_{K^{-1}U}) * t + \text{diag}(1, 1, \beta_{norm}) * R * x_{mean}). \quad (11)$$

The rotation matrix remains unchanged. These equations and their converse (i.e., unnormalized parameters in terms of normalized parameters) are used for transformation from one set of parameters to the other.

The normalized parameters are solved in much the same way as for the unnormalized ones as outlined before. However, there are some differences. The full equations needed to calculate the derivatives of u with respect to the modeled parameters are presented below.

Let $P_{norm} = (\Delta t_{norm}, \Delta r, \Delta\beta_{norm})$. The general equation that is used to calculate the updates to the parameters is $$\frac{dI}{dp_{norm}} * p_{norm} = -\begin{pmatrix} E(B_{norm,x_1}) \\ \cdots \\ E(B_{norm,x_i}) \\ \cdots \\ E(B_{norm,x_m}) \end{pmatrix} \quad (12)$$

where the errors with respect to normalized B parameters can be calculated easily by converting them to the corresponding unnormalized parameters and taking the corresponding error. The other matrices are defined in the usual way as described for the case of unnormalized parameters.

The image derivatives are determined with respect to the normalized parameters as follows. The derivative $dI/dp_{norm}$ for a particular pixel $x_r$ in the reference image is $$\frac{dI}{dp_{norm}} = \frac{dI}{du} * \frac{du}{dU} * \frac{dU}{dU_{norm}} * \frac{dU_{norm}}{dp_{norm}} \quad (13)$$

where the image gradient $$\frac{dI}{du} = (I_x \quad I_y) \quad (14)$$

and the gradients $$\frac{du}{dU} = \frac{1}{U_h}\begin{pmatrix} 1 & 0 & -u_x \\ 0 & 1 & -u_y \end{pmatrix} \quad (15)$$

$$\frac{dU}{dU_{norm}} = K * \text{diag}(1, 1, 1/\sigma_{K^{-1}U}). \quad (16)$$

To calculate $dU_{norm}/dp_{norm}$ for each of the $p_{norm}$ parameters the change in $U_{norm}$ is computed when one of the parameters is perturbed keeping the others zero. Thus, $$\frac{dU_{norm}}{dt_{norm}} = \text{diag}(1, 1, 1) \quad (17)$$

and $$\frac{dU_{norm}}{d\beta_{norm}} = \text{diag}(0, 0, 1)Rx_{norm} \quad (18)$$

It is known that $$R(\phi + d\phi)w = R(\phi) \, w - w \times d\phi = R(\phi)w - [w]_x d\phi$$

where notation $[w]_x$ means the skew-symmetric cross-matrix of a 3-vector 5 w:

$$[w]_x = \begin{pmatrix} 0 & -w_z & w_y \\ w_z & 0 & -w_x \\ -w_y & w_x & 0 \end{pmatrix} \quad (19)$$

Hence $$\frac{dU_{norm}}{d\Delta r} = \text{diag}(1, 1\beta_{norm}) * [-Rx_{norm}]_x \quad (20)$$

Combining all these derivatives, the model derives the final 3×7 matrix defining $dU_{norm}/dp_{norm}$.

By combining the results for the different matrices, a row of the $dI/dp_{norm}$ matrix for each of the pixels in the region of interest in the reference image is determined. Thus, the algorithm generates the m×7 matrix required in equation (11) which is then used in the Levenberg-Marquardt algorithm for each level of the Laplacian pyramid to find the Euclidean parameters in a coarse to fine manner.

The Euclidean Algorithm is an iterative update algorithm which requires a good initial estimate of the parameters for it to work. Therefore, the algorithm is used as part of a complete geo-registration system rather than as a stand-alone algorithm.

In a geo-registration system, generally the task is to register every frame of the whole video sequence to the reference image data set—orthophoto and DEM. Additional inputs may include ESD for some frames or, equivalently, points correspondences picked by a human operator. In order to accomplish this task efficiently, accurately, and reliably, the technique exploits in addition to coarse-to-fine in scale, progressive model complexity and temporal continuity.

In progressive model complexity, e.g., translation to affine to projective 2D to Euclidean, the registration result of each stage becomes the initial seed for the next stage. This is useful because searching over a large range of uncertainty is easier with a low order model, while increasing the model order too quickly may fail when the practical convergence range of the Euclidean algorithm is exceeded by the registration error of low order estimates.

Indeed, the initial pose uncertainty can be large when the ESD for a frame is very rough or missing and no temporal prediction is available. Coarse alignment block 216 aligns the video and reference image to within a few pixels.

Initializing a given stage's parameters from a prior stage model is generally straightforward-just assume zero for the parameters not previously estimated. However, the projective 2D model is converted to the Euclidean model $(t,R,\beta)$ that best matches the projective 2D mapping from reference to video for points that lie on the local planar approximation of the DEM.

Temporal continuity may be exploited to avoid the expense of full progressive complexity on every frame to be georegistered, or when a frame has no ESD of its own. One approach is to initialize a model not from a next lower order model estimated in the current frame but based on the same model in the previous frame, cascaded with an interframe transformation. This process is a form of tracking that is performed by the tracking block 220 of FIG. 2 where a previously computed parametric transformation associated with a prior frame is used to initialize (or seed) a parametric transformation of the present frame. For example, given Euclidean parameters $(t, R, \beta)$ for the previous frame, those parameters could be connected into projective parameters that match for points on the local planar approximation of the DEM, cascaded with the interframe projective transformation, then connected to the Euclidean parameters by the method given above. Another approach is to build a local mosaic out of a sequence of adjacent frames—again using interframe information—and geo-registering the mosaic instead of individual frames. This has the added benefit of collecting a larger spatial context, since a single frame might not have enough features that match well to the reference image. For both approaches, adjacent video frames need to be aligned with respect to each other using some parametric model. This can be done reliably even if features are too sparse for georegistration because the interframe change of appearance and geometry is small.

The overall sequencing of operations constitutes the control strategy of the complete georegistration system, and many variations can be devised by those skilled in the art.

Once, the alignment parameters have been computed, the display generation module 206 can warp the reference image to the video image or vice versa, accurately overlay certain reference information onto the video image, and the like. In one embodiment of the invention the video images can be warped to the reference image. These video images can then be merged to construct geo-mosaics (geo-referenced video mosaics). These mosaics can be used to update the reference imagery. The video mosaics that are warped in this manner are coupled to the reference database module 204 along path 250 in FIG. 2.

For annotation and other visualization tasks, it is important for the user to be able to map points from the video to the reference image and vice versa. Similarly for warping the video image to the reference image, the invention can use reverse warping with bilinear interpolation. However, to warp the reference image to appear in the video image coordinates, the invention must use forward warping. Point mappings in the forward warping process are computed using the above technique.

To accomplish the overlay process, the display module contains a video mixer that combines the video and database information on the operator's reference overview image monitor window. Additionally, the overlay may include attached sound/text references for point and click recall of additional information pertaining to the imaged scene. As such, the video images can be mapped to the geo-spatial reference information or the geo-spatial reference information can be mapped to the video. This flexible integration of currently generated video and database information provides a rich source of accessible information for many applications.

The annotation information, the video and the transformation parameters are provided to the display module 206. The display module produces various user defined display formats. For example, the video or video mosaic can be overlaid atop the reference images or vice versa, annotation data can be overlaid atop the video, reference images and annotation information can both be overlaid atop the video images and so on. The database may further contain DEM maps and multi-modal annotations such as graphics, text, audio, maps and the like. Additionally, the video view can be used as an initial view of a scene, then the reference database imagery could be displayed as a synthetic view of the scene extrapolated from the original view as a virtual camera moves from the initial view through the scene, i.e., a synthetic "fly through."

Furthermore, objects in the video can be identified by the user and marked with a cursor. The system can accurately geo-locate the selected point with respect to the reference coordinate system.

Although various embodiments which incorporate the teachings of the present invention have been shown and described in detail herein, those skilled in the art can readily devise many other varied embodiments that still incorporate these teachings.

What is claimed is:

1. A system for performing geo-spatial registration of an input image and geographically calibrated reference imagery and a digital elevation map (DEM) comprising:

a reference database module containing geographically calibrated reference imagery and DEM, for producing geographically calibrated reference imagery and DEM relating to imagery in said input image; and an alignment module, coupled to said reference database module, for aligning said input image to said geographically calibrated reference imagery and DEM using a Euclidean model.

2. The system of claim 1 further comprising:

a mosaic generation module for producing an image mosaic as said input image, where said image mosaic is generated from a sequence of sensor images.

3. The system of claim 1 further comprising:

a source of sensor attitude for generating attitude information pertaining to a sensor producing said input image.

4. The system of claim 3 wherein said alignment module further comprises:

a coarse alignment block, coupled to said reference database module and said sensor attitude source, for aligning said geographically calibrated reference imagery and DEM to alignment with said input image using said sensor attitude.

5. The system of claim 1 wherein said alignment module further comprises:
a coarse alignment block, coupled to said reference database module, for aligning said geographically calibrated reference imagery and DEM.

6. The system of claim 4 wherein said alignment module further comprises:
a fine alignment block, coupled to said coarse alignment block, for accurately aligning said input image to said geographically calibrated reference imagery and DEM to a sub-pixel accuracy.

7. The system of claim 3 wherein said alignment module further comprises a synthetic view generation block for warping said geographically calibrated reference imagery and DEM to have a viewpoint similar to a viewpoint of said sensor.

8. The system of claim 3 wherein said sensor is a video camera.

9. The system of claim 5 further comprising a tracking block, coupled to said fine alignment block, for using a previously computed parametric transformation associated with a prior frame as an initialization transformation for computing a parametric transformation for a present frame.

10. The system of claim 5 further comprising a tracking block, coupled to said fine alignment block, for tracking said parametric transformation such that a new parametric transformation does not have to be computed for each new input image.

11. The system of claim 1 further comprising a display module for generating a display that uses the parametric transformation to align said geographically calibrated reference imagery with said input image and simultaneously display said geographically calibrated reference imagery and said input image.

12. The system of claim 4 wherein said coarse alignment block further comprises:
a input image salient feature extractor;
a reference image salient feature extractor;
an exhaustive search engine; and
a directed matching processor.

13. The system of claim 5 wherein said fine alignment block aligns imagery using the Euclidean model:

$$u = \pi(K^*(t + \text{diag}(1,1,\beta)^* R^* x_w)) \text{ where}$$

t is a translation vector, $\beta$ is an inverse focal length, R is a rotational matrix, $X_w$ are 3D coordinates, and K are camera parameters.

14. A method for performing geo-spatial registration of an input image and geographically calibrated reference imagery and digital elevation map (DEM) comprising:
producing geographically calibrated reference imagery and DEM relating to imagery in said input image; and
aligning said input image to said geographically calibrated reference imagery and DEM using a Euclidean model.

15. The method of claim 14 further comprising the step of:
producing an image mosaic as said input image, where said image mosaic is generated from a sequence of sensor images.

16. The method of claim 14 further comprising the step of:
generating attitude information pertaining to a sensor producing said input image.

17. The method of claim 16 wherein said aligning step further comprises the step of:
coarsely aligning said geographically calibrated reference imagery and DEM to alignment with said input image using said sensor attitude.

18. The method of claim 17 wherein said aligning step further comprises the step of:
accurately aligning said input image to said geographically calibrated reference imagery and DEM to a sub-pixel accuracy.

19. The method of claim 17 wherein said aligning step further comprises warping said geographically calibrated reference imagery and DEM to have a viewpoint similar to a viewpoint of said sensor.

20. The method of claim 18 further comprising the step of:
tracking said parametric transformation such that a new parametric transformation does not have to be computed for each new input image.

21. The method of claim 14 further comprising the step of:
generating a display that uses the parametric transformation to align said geographically calibrated reference imagery with said input image and simultaneously display said geographically calibrated reference imagery and said input image.

22. The method of claim 18 wherein said accurate aligning step further comprises the step of:
selecting an alignment process best suited for the input image.

23. The method of claim 14 further comprising the step of:
determining geographic coordinates of a user selected point within said input image.

24. The method of claim 14 further comprising the step of:
compensating for lens distortion associated with the input image.

25. The method of claim 14 further comprising the step of:
updating the geographically calibrated reference imagery in the reference database with information from the input image.

26. The method of claim 14 further comprising the step of:
generating a synthetic fly through starting at a current viewpoint of the input image and continuing using the geographically calibrated reference imagery.

27. The method of claim 17 wherein said coarsely aligning step further comprises:
extracting salient features from the input image;
extracting salient features from the a reference image;
exhaustively searching the salient features of the input image and the reference image; and
identifying matching salient features in the input image and the reference image.

28. The method of claim 18 wherein said accurately aligning aligns imagery using the Euclidean model:

$$u = \pi(K^*(t + \text{diag}(1,1\beta)^* R^* x_w)) \text{ where}$$

t is a translation vector, $\beta$ is an inverse focal length, R is a rotational matrix, $X_w$ are 3D coordinates, and K are camera parameters.

29. A digital storage medium containing a computer program that, when executed by a general purpose computer, forms a specific purpose computer that performs the steps of:
producing geographically calibrated reference imagery and digital elevation map (DEM) relating to imagery in said input image; and
aligning said input image to said geographically calibrated reference imagery and DEM using a Euclidean model.

30. The medium of claim 29 further performing the step of:
producing an image mosaic as said input image, where said image mosaic is generated from a sequence of sensor images.

* * * * *